United States Patent
Dorfman

(10) Patent No.: US 8,551,367 B2
(45) Date of Patent: *Oct. 8, 2013

(54) POLYMER THICK FILM SOLDER ALLOY CONDUCTOR COMPOSITION

(71) Applicant: E I du Pont de Nemours and Company, Wilmington, DE (US)

(72) Inventor: Jay Robert Dorfman, Durham, NC (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/668,404

(22) Filed: Nov. 5, 2012

(65) Prior Publication Data

US 2013/0187100 A1 Jul. 25, 2013

Related U.S. Application Data

(60) Provisional application No. 61/588,251, filed on Jan. 19, 2012.

(51) Int. Cl.
*H01B 1/22* (2006.01)
*B05D 5/12* (2006.01)

(52) U.S. Cl.
USPC ................ 252/512; 252/514; 427/96.1

(58) Field of Classification Search
USPC ......... 252/512–514, 518.1; 427/58, 96.1, 101
See application file for complete search history.

(56) References Cited

U.S. PATENT DOCUMENTS

| 5,062,896 | A | 11/1991 | Huang et al. | |
| 7,857,998 | B2 * | 12/2010 | Dorfman | 252/514 |
| 2010/0084757 | A1 | 4/2010 | Hariharan et al. | |
| 2010/0252616 | A1 | 10/2010 | Shearer et al. | |
| 2012/0328361 | A1 * | 12/2012 | Liu et al. | 403/272 |

* cited by examiner

*Primary Examiner* — Mark Kopec

(57) ABSTRACT

The invention is directed to a polymer thick film composition comprising solder alloy powder and organic medium comprising organic polymeric binder and solvent. The composition may be processed at a time and temperature necessary to remove all solvent. The invention is further directed to method(s) of electrode formation on circuits using such compositions and to articles formed from such methods and/or compositions.

8 Claims, No Drawings

POLYMER THICK FILM SOLDER ALLOY CONDUCTOR COMPOSITION

FIELD OF THE INVENTION

The invention is directed to a polymer thick film (PTF) solder alloy conductor composition for use in many different applications. In one embodiment, the PTF solder alloy composition is used as a screen-printed conductor on a thin film substrate such as ITO-sputtered glass. The PTF solder alloy functions as a grid electrode. This composition may further be used for any other application where conductivity (low resistivity) is required.

BACKGROUND OF THE INVENTION

This invention is directed to a polymer thick film solder alloy composition for use in electronic devices. PTF silver conductors are quite prevalent in electronic circuitry as the conductor of choice due to the high conductivity (<50 milliohms/sq) and reliability. However, in recent years, the price of silver has tripled to the order of $30/troy oz and it is therefore becoming too expensive to use in circuitry. Alternatives to silver are being sought with little compromise in electrical properties but at reduced cost. It is the intent of this invention to provide such an alternative.

SUMMARY OF THE INVENTION

This invention provides a polymer thick film solder alloy conductor composition comprising:
(a) 65 to 95 wt % solder alloy powder consisting of tin, silver, and copper and possessing an average particle size of 2 to 18 µm and a surface area/mass ratio in the range of 0.20 to 1.3 $m^2/g$; dispersed in
(b) 5 to 35 wt % organic medium comprising
    (i) a vinyl co-polymer resin of vinylidene chloride and acrylonitrile, dissolved in
    (ii) organic solvent comprising a dibasic ester; wherein the wt % are based on the total weight of the polymer thick film solder alloy conductor composition.

The composition may be processed at a time and temperature necessary to remove all solvent.

The invention is further directed to a method of electrode formation on circuits using such compositions and to articles formed from such method and composition.

DETAILED DESCRIPTION OF INVENTION

Generally, a thick film composition comprises a functional phase that imparts appropriate electrically functional properties to the composition. The functional phase comprises electrically functional powders dispersed in an organic medium that acts as a carrier for the functional phase. Generally, in thick film technology, the composition is fired to burn out the organics and to impart the electrically functional properties. However, in the case of polymer thick films, the organics remain as an integral part of the composition after drying. "Organics" as used herein comprise polymer, resin or binder components of a thick film composition. These terms may be used interchangeably and they all mean the same thing.

In one embodiment, the polymer thick film solder alloy conductor composition comprises 65 to 95 wt % solder alloy powder consisting of tin, silver, and copper and 5 to 35 wt % organic medium.

To summarize, the main components of the thick film conductor composition are a conductor powder dispersed in an organic medium, which is comprised of polymer resin and solvent. The components are discussed herein below.

A. Conductor Powder

The electrically functional powders in the present thick film composition are solder alloy conductor powders that contain tin, silver, and copper, known as SAC alloys, with tin the largest component, i.e. greater than 90% by weight.

The particle diameter and shape used on the solder alloy powder are particularly important and have to be appropriate to the application method. In one embodiment the particles are spherical. In another embodiment the particles are in flake form. The particle size distribution of the solder alloy particles is also critical with respect to the effectiveness of the invention. As a practical matter, the particle size is in the range of 1 to 100 µm. In an embodiment, the average particle size is 2 to 18 µm. In addition, the surface area/weight ratio of the solder alloy particles is in the range of 0.2-1.3 $m^2/g$.

Furthermore, it is known that small amounts of one or more other metals may be added to the solder alloy conductor compositions to improve the properties of the conductor. Some examples of such metals include: gold, silver, copper, nickel, aluminum, platinum, palladium, molybdenum, tungsten, tantalum, tin, indium, lanthanum, gadolinium, boron, ruthenium, cobalt, titanium, yttrium, europium, gallium, sulfur, zinc, silicon, magnesium, barium, cerium, strontium, lead, antimony, conductive carbon, and combinations thereof and others common in the art of thick film compositions. The additional metal(s) may comprise up to about 1.0 percent by weight of the total composition.

An organic acid be used as a reductant for the solder alloy to reduce any oxidation of the solder alloy surface.

B. Organic Medium

The powders are typically mixed with an organic medium (vehicle) by mechanical mixing to form a paste-like composition, called "paste", having suitable consistency and rheology for printing. The organic medium must be one in which the solids are dispersible with an adequate degree of stability. The rheological properties of the organic medium must be such that they lend good application properties to the composition. Such properties include: dispersion of solids with an adequate degree of stability, good application of composition, appropriate viscosity, thixotropy, appropriate wettability of the substrate and the solids, a good drying rate, and dried film strength sufficient to withstand rough handling.

The organic medium comprises a solution of polymer in organic solvent(s). The organic medium is not conventional in the art and lends unique properties to the composition.

The polymer resin of the present invention is particularly important. The resin used in the present invention is a vinyl co-polymer of vinylidene chloride and acrylonitrile which allows high weight loading of solder alloy powder and thus helps achieve both good adhesion to substrates and low resistivity (high conductivity), two critical properties for conductors in electronic circuitry.

A wide variety of inert liquids can be used as solvents in the organic medium. The most widely used solvents found in thick film compositions are ethyl acetate and terpenes such as alpha- or beta-terpineol or mixtures thereof with other solvents such as kerosene, dibutylphthalate, butyl carbitol, butyl carbitol acetate, hexylene glycol and high boiling alcohols and alcohol esters. In addition, volatile liquids for promoting rapid hardening after application on the substrate can be included in the vehicle. In many embodiments of the present invention, solvents such as glycol ethers, ketones, esters and other solvents of like boiling points (in the range of 180° C. to 250° C.), and mixtures thereof may be used. In one embodiment the organic medium is based on dibasic esters and C-11 ketone solvent. Various combinations of these and other solvents are formulated to obtain the viscosity and volatility requirements desired.

Application of Thick Films

The polymer thick film solder alloy composition also known as a "paste" is typically deposited on a substrate, such as ITO-sputtered glass, that is essentially impermeable to gases and moisture. The substrate can also be a sheet of flexible material. An example is an impermeable plastic such as a composite material made up of a combination of plastic sheet with optional metallic or dielectric layers deposited thereupon. The substrate must be such as to withstand the processing temperature of 160° C. In one embodiment, the substrate can be a build-up of layers with metalized solder alloy paste.

The deposition of the polymer thick film solder alloy composition is performed preferably by screen printing, although other deposition techniques such as stencil printing, syringe dispensing or coating techniques can be utilized. In the case of screen-printing, the screen mesh size controls the thickness of deposited thick film.

The deposited thick film is dried by exposure to heat for typically 10-15 min at 160° C.

The composition of the invention provides conductors with unusually low resistivity, i.e., 35 milliohm/sq. Additionally, this is achieved with a drying temperature approximately 60° C. below the liquidus temperature 217° C. of the solder alloy. The result is very low circuit resistance achieved at low cost and at such a low drying temperature of 160° C. Compositions dried at 180° C. showed a slight decrease in resistance compared to those dried at 160° C., less than 10%.

The present invention will be discussed in further detail by giving practical examples. The scope of the present invention, however, is not limited in any way by these practical examples.

EXAMPLE AND COMPARATIVE EXPERIMENTS

Example 1

The PTF solder alloy conductor paste was prepared by mixing solder alloy powder SAC305 (AMTECH, SMT International LLC, Deep River, Conn.) with an average spherical particle size of 10 μm (range was 5-15 μm) with an organic medium composed of a co-polymer of vinylidene chloride and acrylonitrile resin (Saran™ F-310 resin, Dow Chemical Co., Midland, Mich.). The molecular weight of the resin was approximately 25,000. A solvent was used to dissolve the resin completely prior to adding the solder alloy powder. That solvent was a 50/50 blend of dibasic esters (DuPont, Wilmington, Del.) and Eastman™ C-11 Ketone solvent (Eastman Chemical, Kingsport, Tenn.). A small amount of organic acid (o-anisic acid) was added as a chemical reductant. An additional amount of carbitol acetate solvent was added for screen life purposes.

The composition is given below:

| | |
|---|---|
| 88.23% | SAC305 solder alloy powder - (98.5% Sn, 3% Ag, 0.5% Cu) |
| 8.82 | organic medium (19.5% resin/80.5% solvent) |
| 0.98 | o-anisic acid |
| 1.97 | carbitol acetate |

This composition was mixed for 10 minutes in a Thinky-type mixer. The composition was then used to screen print a pattern on glass. Using a 325 mesh stainless steel screen, a series of lines were printed, and the composition was dried at 180° C. for 10 min. in a forced air box oven. The resistivity was then measured as 35 milliohm/sq at a thickness of 30 μm. As a comparison, a standard PTF silver composition such as DuPont product 5025 was measured as 25 milliohm/sq at a thickness of 12 μm. Although the solder alloy composition has higher resistivity than the best conventional silver conductor, it is close in value at a fraction of the cost silver.

Comparative Experiment A

Another PTF solder alloy composition was prepared as described in Example 1 except that the resin chemistry in the solder alloy composition was changed from the vinyl co-polymer used in Example 1 to a polyhydroxyether resin (PKHH, Phenoxy Associates, Rock Hill, S.C.). All other properties of the formulation, solder alloy powder distribution, and the subsequent processing were the same as Example 1. The normalized resistivity for this composition was approximately 100 ohm/sq, which is 2800 times higher than seen in Example 1. It is apparent that a change in resin chemistry has a significant negative impact on the resistivity of the composition.

Comparative Experiment B

Another PTF solder alloy composition was prepared as described in Example 1 except that the resin chemistry in the solder alloy composition was changed from the vinyl co-polymer used in Example 1 to a polyester resin (Vitel 2200 Resin, Shell Chemicals, Houston, Tex.). All other properties of the formulation, solder alloy powder distribution, and the subsequent processing were the same as Example 1. The normalized resistivity for this composition was approximately 500 ohm/sq, which is 10000 times higher than seen in Example 1. Again, it is apparent that a change in resin chemistry has a significant negative impact on the resistivity of the composition.

Comparative Experiment C

Another PTF solder alloy composition was prepared as described in Example 1 except that the resin chemistry in the solder alloy composition was changed from the vinyl co-polymer used in Example 1 to a vinyl resin (VAGH resin, Dow Chemical Co., Midland, Mich.). All other properties of the formulation, solder alloy powder distribution, and the subsequent processing were the same as Example 1. The normalized resistivity for this composition was approximately 500 ohm/sq, which is 10000 times higher than seen in Example 1. Again, it is apparent that a change in resin chemistry has a significant negative impact on the resistivity of the composition.

The results for the Example and the Comparative Experiments are shown in Table 1 along with those for an Ag paste.

TABLE I

| Composition | Adhesion to ITO/Glass | Resistivity |
|---|---|---|
| 5025 Ag | Fair | 25 mohm/sq |
| Example 1 | Good | 35 mohm/sq |
| Comparative Example A | Good | 100 ohm/sq |

TABLE I-continued

| Composition | Adhesion to ITO/Glass | Resistivity |
|---|---|---|
| Comparative Example B | Fair | 500 ohms/sq |
| Comparative Example C | Fair | 500 ohms/sq |

What is claimed is:

1. A polymer thick film solder alloy conductor composition comprising:
   (a) 65 to 95 wt % solder alloy powder consisting of tin, silver, and copper and possessing an average particle size of 2 to 18 µm and a surface area/mass ratio in the range of 0.20 to 1.3 m$^2$/g; dispersed in
   (b) 5 to 35 wt % organic medium comprising
      (i) a vinyl co-polymer resin of vinylidene chloride and acrylonitrile, dissolved in
      (ii) organic solvent comprising a dibasic ester;
   wherein the wt % are based on the total weight of the polymer thick film solder alloy conductor composition.

2. The composition of claim 1, wherein the solder alloy powder possesses an average particle size of 8 to 12 µm.

3. The composition of claim 1, wherein the solder alloy powder contains at least 90% tin by weight and wherein the organic medium contains 16 to 25% vinyl co-polymer resin by weight.

4. The composition of claim 1, wherein the boiling point of the organic solvent is in the range of 180° C. to 250° C.

5. The composition of claim 1, the organic solvent further comprising solvent selected from the group consisting of glycol ethers, ketones, esters and mixtures thereof.

6. An electrical circuit comprising an electrode formed from the composition of any of claims 1-5, wherein the composition has been dried to form the electrode.

7. A method of forming an electrode in an electrical circuit, comprising:
   a) preparing the composition of claim 1;
   b) applying the composition onto a substrate; and
   c) drying the composition to form the electrode.

8. An electrical circuit comprising an electrode formed by the method of claim 7.

* * * * *